Dec. 11, 1951 S. M. UDALE 2,578,028
THROTTLE CONTROLLED CARBURETOR PRODUCING
A RICH MIXTURE FOR AN EXHAUST TURBINE
Filed Jan. 31, 1947 3 Sheets-Sheet 2

INVENTOR.
Stanley M. Udale.

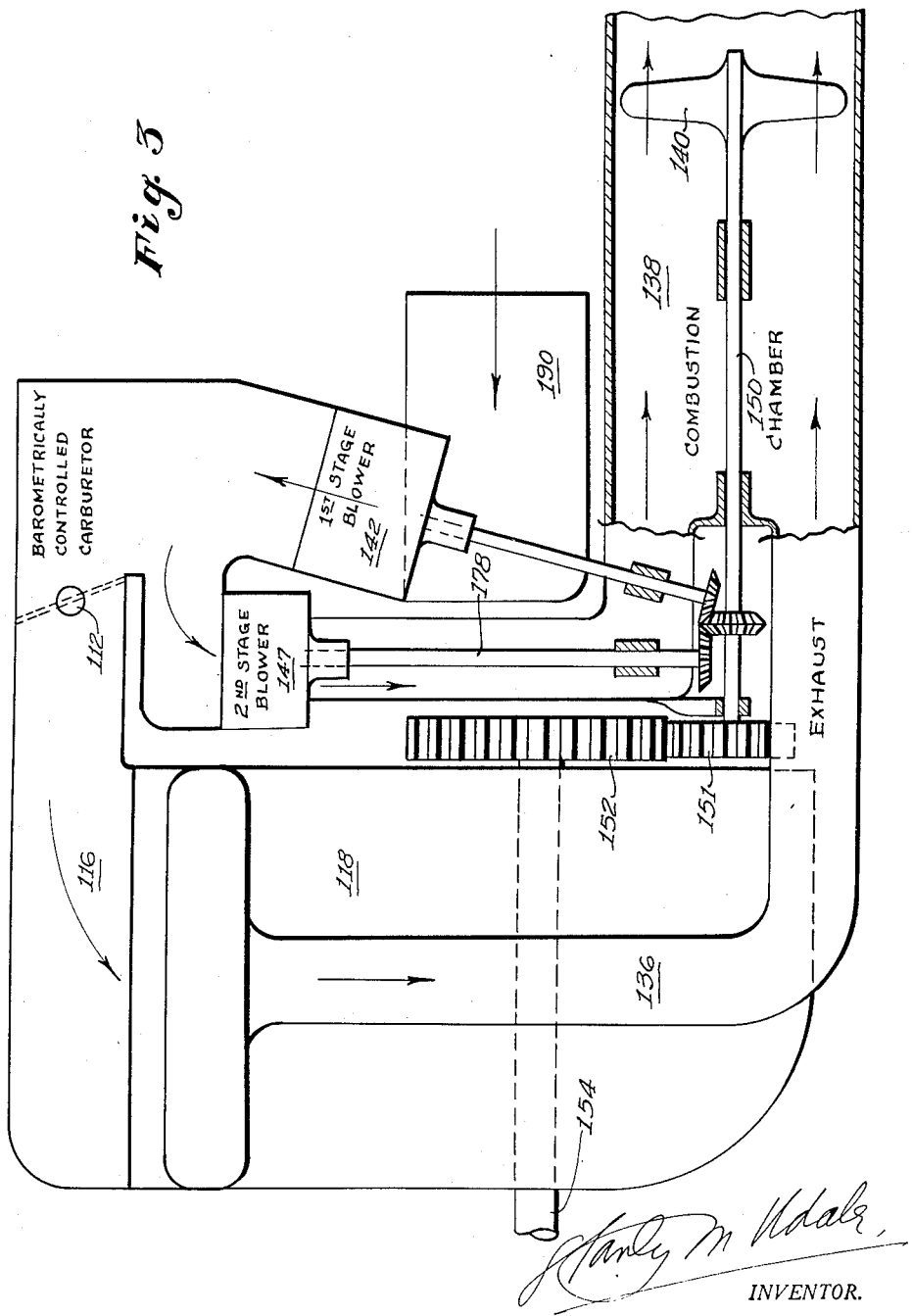

Patented Dec. 11, 1951

2,578,028

UNITED STATES PATENT OFFICE 2,578,028

THROTTLE CONTROLLED CARBURETOR PRODUCING A RICH MIXTURE FOR AN EXHAUST TURBINE

Stanley M. Udale, Detroit, Mich., assignor to George M. Holley and Earl Holley

Application January 31, 1947, Serial No. 725,532

11 Claims. (Cl. 60—13)

The object of this invention is to double the power of a truck engine for a short period of time by mechanically coupling a gas turbine to the ordinary truck engine. The fuel for the gas turbine is derived from the exhaust from the engine. The carburetor is arranged to automatically give the required rich mixture.

Fig. 3 shows a schematic drawing of my invention.

Figure 1:
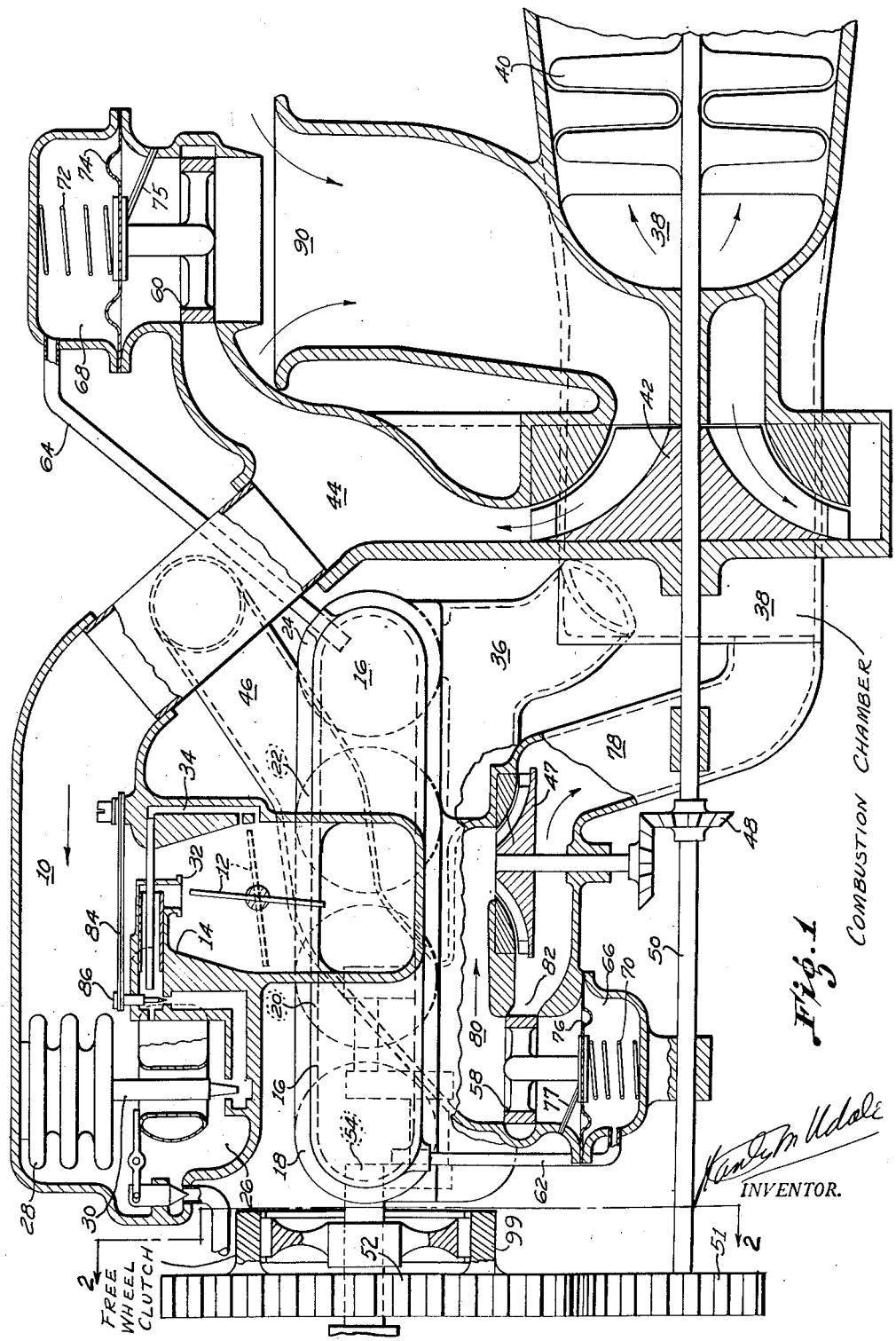
Figure 1 shows diagrammatically the preferred form of my invention.
Figure 2:
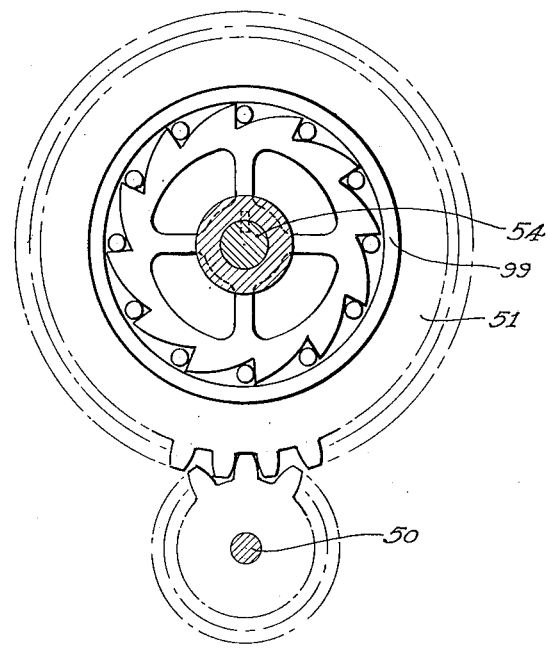
Fig. 2 is a partial elevation taken on plane 2—2 of Fig. 1.

In Figure 1, 10 is the air entrance to the carburetor, 12 is the throttle, 14 is the venturi, 16 is the inlet manifold leading to the inlet ports of the cylinders 18—20—22—24. 26 is the carburetor float chamber, 28 is a barometric element responsive to the pressure in the air entrance 10 and supports the needle valve 30. 32 is the fuel nozzle of the conventional type having the usual low speed fuel passage 34 cooperating with the upstream lip of the throttle 12.

An exhaust manifold 36 discharges exhaust gases into a combustion chamber 38 and this chamber delivers exhaust gases to the gas turbine 40 which lowers the exhaust pressure to that of the atmosphere.

The gas turbine drives a first stage supercharger 42 which receives air from the atmosphere through the air entrance 90 and delivers compressed air to the air entrance 10 along the pipe 44. Through bypass 46 one-third of the compressed air, delivered to the pipe 44, is bypassed to the second stage supercharger 47, driven by the gears 48 from the gas turbine shaft 50 which, through the gears 51 and 52, is connected to the crankshaft 54 of the engine. The gear 52, mounted on the crankshaft 54, is designed so that it will not drive the gear 51 but will be driven by the gear 51. In other words the gear 51 is associated with an ordinary overrunning clutch 99 so that normally the free-wheeling of the gear 52 permits the gas turbine 40 and the two superchargers 42 and 47 to "idle" along without absorbing power.

Unloading valves 58 and 60 are provided so that when the throttle 12 is closed these unloading valves 58 and 60 are automatically opened to unload the two superchargers 42 and 47.

Vacuum or low pressure pipes 62 and 64 connect the inlet manifold 16 with chambers 66 and 68 which contain springs 70 and 72. Diaphragms 74 and 76 support the valves 60 and 58. Two inclined stops 75 and 77 limit the travel of the diaphragms 74 and 76 so that the springs 70 and 72 normally hold the valves 60 and 58 in their closed positions, that is, the positions in which they are shown. When the pressure in the inlet manifold falls the valve 60 rises and the valve 58 falls so that neither of the two superchargers 42 or 47 is effective. A pipe 78 delivers doubly compressed air to the combustion chamber 38 when the throttle is open. When the throttle 12 is wide open, valve 58 remains closed as shown. Under this condition compressed air from supercharger 42 is compressed a second time by the supercharger 47, and delivered to the combustion chamber 38. When throttle 12 is first closed the pressure drop at 12 first overcomes spring 70 and opens the valve 58. Hence, the diaphragm 76 moves away from stop 77 as the throttle 12 is closed and, before the diaphragm 74 moves away from stop 75, so that the throttle 12 controls the delivery of compressed air to the combustion chamber 38 from the supercharger 47, as well as the delivery of compressed air to the engine. When the valve 58 falls a bypass 80, from the bypass 46, permits compressed air from the passage 82 and from the outlet 78 to return through 80 and 46. The pump 47 thus becomes inoperative.

A thermostat 84, in the air entrance 10, reduces the richness of the mixture in the inlet manifold and hence, the richness of the exhaust in the combustion chamber 38, when the temperature in the air inlet 10 exceeds a predetermined safe maximum temperature, for example 120° F.

Fig. 3 is a simplified schematic drawing showing the air entrance 190 leading to the first stage blower 142 which supplies air to the barometrically controlled carburetor which is also manually controlled by the throttle 112. The inlet manifold 116 supplies air and fuel to the engine 118.

An exhaust manifold 136 supplies a rich mixture exhaust to the combustion chamber 138 containing the turbine 140. A shaft 150 driven by turbine 140 drives through a shaft 178, the second stage blower 147 which delivers air at high pressure to the combustion chamber 138. The shaft 150 also drives the first stage blower 142 and furnishes power through the gear 151 to the gear 152 to increase the power output of the engine 118 at the crankshaft 154.

*Operation*

When the gas turbine develops moderate power and as the throttle 12 is opened the valve 58 is pushed up towards the stop 77 by the spring 70 and the valve 60 is pushed down towards the stop 75 by the spring 72 into the position shown in the drawing, so that the superchargers 42 and 47 are put into action. All the power, as first developed in the gas turbine 40, is absorbed in driving the superchargers 42 and 47 and the gear 52 free-wheels on the crankshaft 54.

After the throttle 12 has been opened for a few seconds the back pressure in the exhaust manifold 36 builds up and the gas turbine begins to develop real power. Eventually there is excess power available and finally the gas turbine helps drive the crankshaft 54 and contributes to the total power developed.

When the throttle 12 is open 125% extra air (above that normally required by the engine) is delivered by the supercharger 42. 75% of this (⅓ of 225%) is delivered through passage 46 to the second stage supercharger 47. 150% of the normal air is delivered to the air entrance 10 and this extra air at a pressure of 44-47 inches of mercury (absolute) compresses the barometric element 28 and opens the needle valve 30 so as to deliver a 0.11 fuel/air ratio or 9 to 1 air fuel mixture. This burns to produce carbon-monoxide. The air admitted through the pipe 78 completes the combustion of the carbon-monoxide to carbon-dioxide in the combustion chamber 38.

The compressed air from the passage 78 is sufficient to completely burn all the carbon-monoxide of the exhaust from the engine to carbon-dioxide. This raises the temperature in the combustion chamber 38.

The gases in the combustion chamber 38 expand through the gas turbine 40 and not only drive the superchargers 42 and 47 but also deliver useful work through the gears 51 and 52 to the engine so that work is obtained both from the cylinders 18-20-22-24 and also from the gas turbine 40.

It is thus possible to obtain a 100% increase in power for a short period of time by this means and the temperature in the turbine will not normally exceed the safe limit of 1450° F. By increasing the capacity of the second stage air pump 47 the temperature of the combustion chamber 38 will be reduced but then the efficiency of the power plant will also be reduced.

When the temperature in the air entrance 10 exceeds a predetermined critical temperature, for example 120° F., then the needle valve 86 descends and the mixture ceases to be rich until the temperature in the air entrance 10 falls below the dangerously critical temperature.

What I claim is:

1. A reciprocating internal combustion engine, a gas turbine coupled mechanically to the engine, a supercharger for said engine, a bypass leading from the air supply to said engine downstream from said supercharger, a compressor for said turbine in said bypass and in series with said supercharger, an air entrance to the engine, said supercharger and compressor for said engine and said turbine being driven by the turbine, barometric means responsive to the air pressure in the air entrance, fuel and air control means connected thereto adapted to deliver a rich mixture to the engine when the air entrance pressure is higher than the normal atmospheric pressure comprising a pressure responsive element, a fuel control valve connected thereto, means for burning the rich exhaust produced from said rich mixture including a combustion chamber connected to said bypass and in which the air from said bypass meets the rich exhaust, an outlet from the combustion chamber leading to said turbine.

2. A device as set forth in claim 1 in which there is an air throttle in the air entrance, automatic means responsive to the low pressure on the engine side of the throttle when the throttle is closed to unload both said supercharger and said compressor.

3. A device as set forth in claim 1 in which there are thermostatic means responsive to the temperature in the air entrance which will reduce the fuel flow from said carburetor when the temperature in the air entrance rises above a predetermined safe maximum.

4. A device as set forth in claim 1 in which there is a free wheel connection between the driving element of the gas turbine and the mechanical coupling to the internal combustion engine.

5. A power plant including an internal combustion engine and an exhaust gas turbine geared together comprising a combustion chamber for said gas turbine, a supercharger driven by said turbine, an air supply for said supercharger connected to said internal combustion engine, a fuel supply, a carburetor connected to said fuel supply, a barometric means responsive to the pressure of the air from said supercharger said barometer means mounted in said carburetor adapted to give an increase in fuel/air ratio as the pressure of the air increases, a bypass leading from a point adjacent the air entrance to the carburetor and leading to the combustion chamber of said gas turbine, a compressor driven by said turbine located in said bypass so as to increase the pressure of the air entering said combustion chamber, a passage connecting the exhaust from the internal combustion engine to said combustion chamber, and an outlet from said combustion chamber leading to said gas turbine.

6. A device as set forth in claim 5 in which the mechanism by means of which the said engine and said turbine are geared together includes a free wheel mechanism so that the gas turbine can drive the engine but so that the engine cannot drive the gas turbine.

7. A device as set forth in claim 5 in which there is an air throttle in the air entrance to the carburetor, automatic means responsive to the low pressure on the engine side of the throttle when the throttle is closed to unload both said supercharger and said compressor.

8. A device as set forth in claim 7 in which the automatic means consist of a movable wall, a chamber, a spring in said chamber engaging with said wall, a balanced valve connected to said movable wall in each of said automatic means.

9. A device as set forth in claim 5 in which there is an air throttle in the air entrance to the carburetor, automatic means responsive to the low pressure on the engine side of the throttle when the throttle is closed to unload both said supercharger and said compressor and in which there are thermostatic means responsive to the temperature in the air entrance which will reduce the fuel flow from said carburetor when the temperature in the air entrance exceeds a predetermined safe maximum.

10. A power plant for an automotive vehicle combining an internal combustion engine, a gas turbine, mechanical coupling means therebetween including a free-wheeling mechanism so that the gas turbine can drive the engine but the engine can not drive the gas turbine, a supercharger driven by said gas turbine and adapted to supply air under pressure to said first engine, a combustion chamber for the gas turbine, a connection from the exhaust from said first engine to said combustion chamber, a passage from the air entrance to said engine direct to said combustion chamber, automatic barometric means responsive to an increase in the pressure in the air entrance to said first engine to enrich the fuel/air mixture so that the exhaust gas from the engine is combustible.

11. A device as set forth in claim 10 in which there are thermostatic means located in the air entrance to said first engine to neutralize the effect of said barometric means whenever the temperature of the air entering the engine rises above a predetermined critical value.

STANLEY M. UDALE.

REFERENCES CITED

The following references are of record in the file of this patent:

UNITED STATES PATENTS

| Number | Name | Date |
|---|---|---|
| 2,375,006 | Larrecq | May 1, 1945 |
| 2,421,518 | Molloy | June 3, 1947 |